(12) United States Patent
Bose et al.

(10) Patent No.: US 8,458,501 B2
(45) Date of Patent: Jun. 4, 2013

(54) MEASURING DATA SWITCHING ACTIVITY IN A MICROPROCESSOR

(75) Inventors: Pradip Bose, Yorktown Heights, NY (US); Alper Buyuktosunoglu, White Plains, NY (US); Christopher J. Gonzalez, Shelburne, VT (US); Moinuddin K. Qureshi, White Plains, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 12/844,372

(22) Filed: Jul. 27, 2010

(65) Prior Publication Data

US 2012/0030481 A1 Feb. 2, 2012

(51) Int. Cl.
 *G06F 1/32* (2006.01)
 *G06F 3/00* (2006.01)
(52) U.S. Cl.
 USPC ............................................. 713/320; 710/18
(58) Field of Classification Search
 USPC ............ 713/300, 320, 323, 324, 322; 710/18, 710/34
 See application file for complete search history.

(56) References Cited

U.S. PATENT DOCUMENTS

| | | | |
|---|---|---|---|
| 5,388,265 A | 2/1995 | Volk | |
| 5,696,694 A * | 12/1997 | Khouja et al. | 716/120 |
| 7,110,420 B2 | 9/2006 | Bashirullah et al. | |
| 7,624,286 B2 | 11/2009 | Lin et al. | |
| 7,668,988 B2 * | 2/2010 | Bertram | 710/65 |
| 2005/0223344 A1 * | 10/2005 | Sato et al. | 716/1 |
| 2006/0058994 A1 | 3/2006 | Ravi et al. | |
| 2008/0243403 A1 * | 10/2008 | Furukawa | 702/60 |
| 2009/0271167 A1 * | 10/2009 | Zhu et al. | 703/14 |
| 2009/0319219 A1 * | 12/2009 | Hosokawa | 702/117 |
| 2011/0173432 A1 * | 7/2011 | Cher et al. | 713/100 |
| 2011/0218779 A1 * | 9/2011 | Palisetti et al. | 703/2 |

FOREIGN PATENT DOCUMENTS

| | | | |
|---|---|---|---|
| JP | 2002288257 A | * | 10/2002 |
| JP | 2011013713 A | * | 1/2011 |
| WO | WO2006/138077 A1 | | 12/2006 |

* cited by examiner

*Primary Examiner* — Thomas J Cleary
(74) *Attorney, Agent, or Firm* — Francis Lammes; Stephen J. Walder, Jr.; William J. Stock

(57) ABSTRACT

A mechanism is provided for approximating data switching activity in a data processing system. A data switching activity identification mechanism in the data processing system receives an identification of a set of data storage devices and a set of bits in the set of data storage devices in the data processing system to be monitored for the data switching activity. The data switching activity identification mechanism sums a count of the identified bits that have changed state for the data storage device along with other counts of the identified bits that have changed state for other data storage devices in the set of data storage devices to form an approximation of data switching activity. A power manager in the data processing system then adjusts a set of operational parameters associated with the data processing system using the approximation of data switching activity.

20 Claims, 10 Drawing Sheets

MEASURING DATA SWITCHING ACTIVITY IN A MICROPROCESSOR

BACKGROUND

The present application relates generally to an improved data processing apparatus and method and more specifically to mechanisms for measuring data switching activity in a microprocessor.

There is an emerging customer requirement for better power and thermal management in computing systems. Customers increasingly expect systems to behave in such a way as to be power-efficient. Customers also want the ability to set policies that trade off power and performance in order to meet their particular objectives. For example, customers want to be able to over-provision their installations but be able to take advantage of the variability in workloads and utilization to ensure that the systems operate correctly and within the limits of the available power and cooling.

Today's microprocessors deploy several sophisticated power management schemes. These power management schemes require on-the-fly power measurements. However, power measurement of a microprocessor on-the-fly is a difficult task. Power measurement is even more difficult at the sub-unit level of a microprocessor, such as at a core level, L2 cache level, or the like. While power proxy architectures use sets of counters to approximate power consumed in a core, L2, L3, or the like, to aid power management decisions, power proxy architectures lack accuracy due to the fact the data switching power is not taken into account.

SUMMARY

In one illustrative embodiment, a method, in a data processing system, is provided for approximating data switching activity in the data processing system. The illustrative embodiment receives an identification of a set of data storage devices and a set of bits in the set of data storage devices in the data processing system to be monitored for the data switching activity. For each data storage device in the set of data storage devices, the illustrative embodiment captures a state of each bit in the set of bits at time t, captures a state of each bit in the set of bits at time t+1, captures a count of all of the bits in the set of bits that have changed state from time t to time t+1, and sums the count of all of the bits in the set of bits that have changed state with any previously stored count of bits that have changed state for the data storage device to form a count of identified bits that have changed state. The illustrative embodiment sums the count of the identified bits that have changed state for the data storage device along with other counts of the identified bits that have changed state for other data storage devices in the set of data storage devices to form an approximation of data switching activity. The illustrative embodiment adjusts a set of operational parameters associated with the data processing system using the approximation of data switching activity.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for approximating data switching activity and improving the accuracy of a power proxy architecture. The illustrative embodiments detect signal transitions and signal states associated with storage elements, data busses, integrated logic, or the like, in order to compute an approximation of power usage for the switching activity. The illustrative embodiments also provide data switching activity for power model calibration/tuning. That is, the illustrative embodiments may use the approximated power usage due to data switching activity in conjunction with power proxy architectures for power model calibration/tuning.

Figure 1:
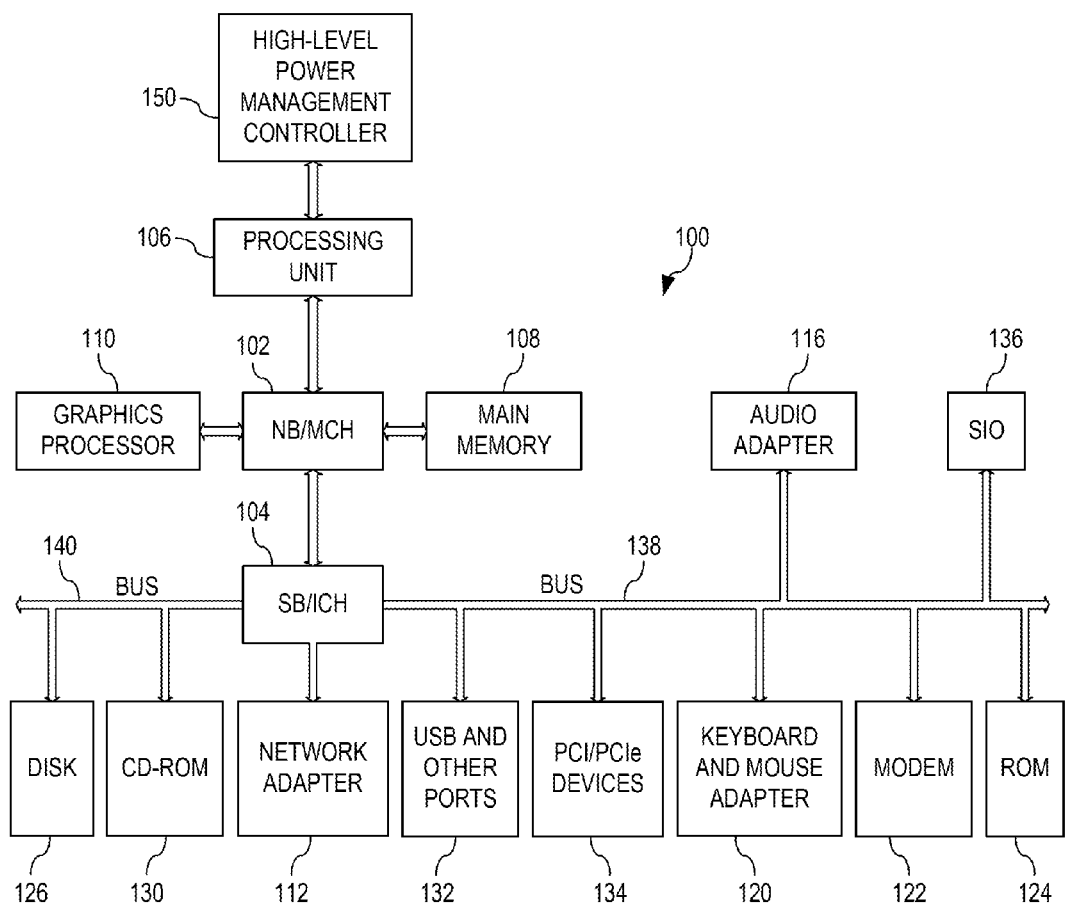
FIG. 1 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as example environments in which aspects of the illustrative embodiments may be implemented. While the description following FIG. 1 will focus primarily on a single data processing device implementation of a mechanism that approximates data switching activity and improves the accuracy of a power proxy architecture, this is only an example and is not intended to state or imply any limitation with regard to the features of the present invention. To the contrary, the illustrative embodiments are intended to include distributed data processing environments and embodiments in which data switching activity may be approximated.

With reference now to the figures and in particular with reference to FIG. 1, example diagrams of data processing environments are provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 illustrates a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both). The power consumed by processing unit 106 may be controlled by high-level power management controller 150 which monitors the temperature, voltage consumption, and voltage leakage of each component within processing unit 106 and uses the gathered information, along with a power scheme for data processing system 100 to determine a power proxy threshold value to meet a defined target for each component. High-level power management controller 150 then sets or adjusts a power proxy threshold value for each of the monitored components in a power manager associated with processing unit 106. Further operations of high-level power management controller 150 will be described in detail in the following Figures.

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

The data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Figure 2:
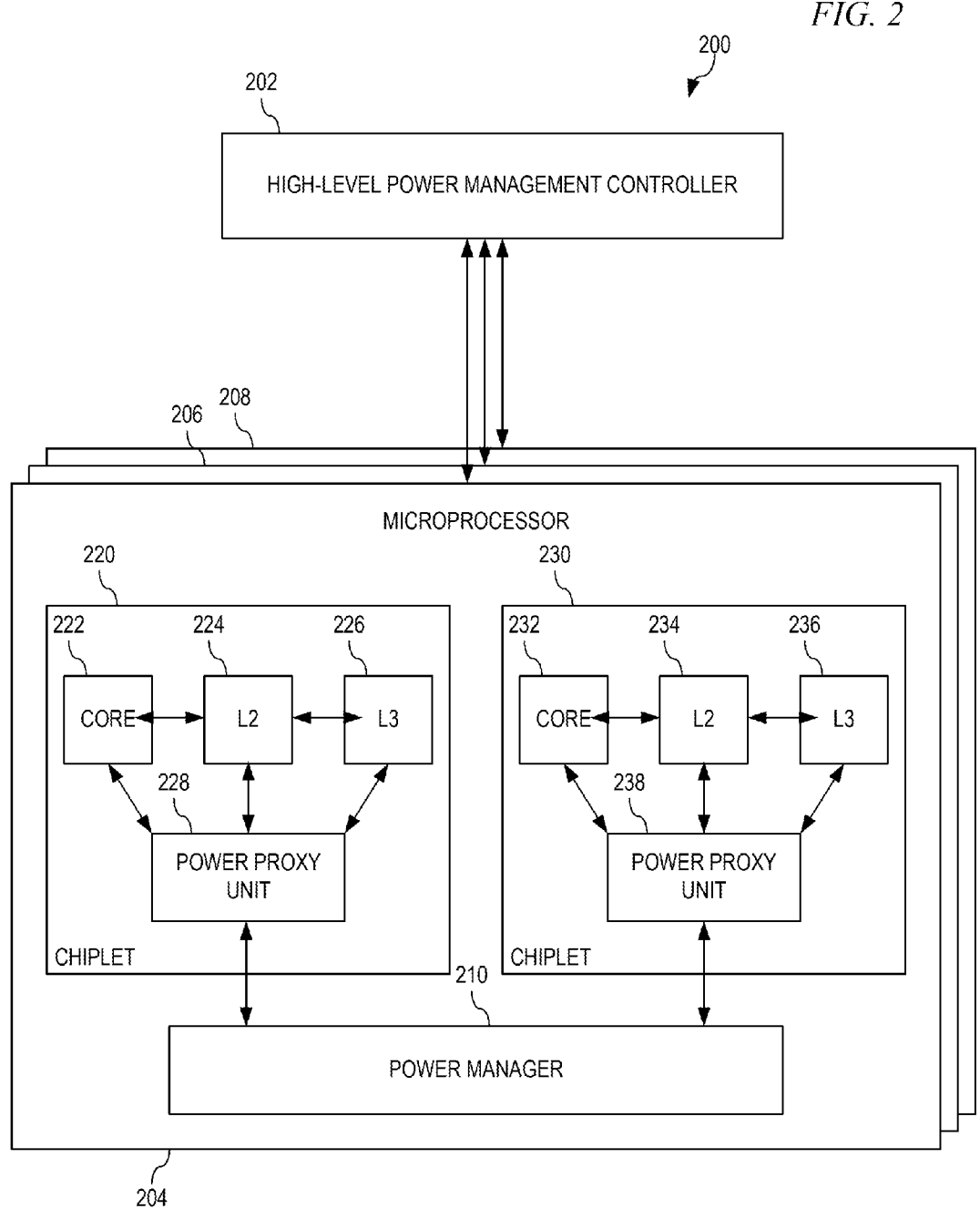
FIG. 2 illustrates an exemplary data processing system comprising a high-level power management controller in accordance with an illustrative embodiment.

FIG. 2 illustrates an exemplary data processing system comprising a high-level power management controller in accordance with an illustrative embodiment. Data processing system 200 comprises high-level power management controller 202 and a set of microprocessors 204, 206, and 208, each of which may be associated with a storage element, data bus, integrated logic, or the like. During the execution of applications or software on data processing system 200, high-level power management controller 202 monitors various conditions associated with a set of components on each of microprocessors 204, 206, and 208. The various conditions may comprise the voltage consumed by each component, the temperature of areas associated with each of the components, voltage leakage associated with each of the components, or the like.

High-level power management controller 202 monitors the temperature, voltage consumption, and voltage leakage of each component and uses the gathered information, along with a power scheme for data processing system 200 to determine a power proxy threshold value to meet a defined target for each component. High-level power management controller 202 then sets or adjusts a power proxy threshold value for each of the monitored components in power manager 210 of each of microprocessors 204, 206, and 208.

Each of microprocessors 204, 206, and 208 comprises power manager 210 and chiplets 220 and 230. A chiplet is a processor core plus some memory cache, such as an L2, L3, or L4 memory cache, or some combination thereof. Chiplet 220 comprises core 222, L2 cache 224, L3 cache 226, and power proxy unit 228. Chiplet 230 comprises core 232, L2 cache 234, L3 cache 236, and power proxy unit 238. While FIG. 2 shows microprocessors 204, 206, and 208 as comprising two (2) chiplets, alternate illustrative embodiments contemplate microprocessors 204, 206, and 208 as comprising any number of chiplets, from one to several.

Power proxy units 228 and 238 monitor a set of counters. Whenever an activity specified to be monitored occurs, power proxy unit 228 or 238 adds a value equal to a power usage weight associated with the activity to a counter. The counter is associated with one activity only. Then, periodically, the values held in the set of counters monitored by power proxy units 228 and 238 are collected by power proxy units 228 and 238. Power proxy units 228 and 238 each add these collected values together to arrive at a power usage estimate value for the unit or component monitored by each of power proxy units 228 and 238. Power proxy units 228 and 238 send these power usage estimate values to power manager 210. Power manager 210 compares the power usage estimate value from power proxy units 228 or 238 to the received power proxy threshold value from high-level power management controller 202 for that component. Based on the comparison, power manager 210 may adjust operational parameters in order to achieve the power usage goals. A power usage goal may be a specific power usage cap. Based on the estimate, if the power usage is not being exceeded, power manager 210 may send signals to increase the frequency, voltage, and/or pipeline instruction rate of the component. If the power usage estimate value exceeds the cap, then power manager 210 may send signals to decrease the frequency, voltage, and/or pipeline instruction rate of the component. Thus, power manager 210 is self-controlling based on the power proxy usage estimate values of power proxy units 228 and 238 and the power proxy threshold value for each component received from high-level power management controller 202.

Each of power proxy units 228 and 238 manages a set of counters. The power proxy unit collects the stored values for the set of counters the power proxy units manages in parallel. Further, a single power manager manages a set of power proxy units. Each power proxy has one or more units assigned that the power proxy unit monitors. The power proxy units may then collect values in parallel or independently of each other. Further, the collection period is configurable for each power proxy unit and each power proxy unit may collect the stored values for different periods than every other power proxy managed by a power manager.

Power manager 210 and power proxy units 228 and 238 have memory and a programmable interface that allows a user to specifically assign what specific counters will count what specific activities as well as assigning the weight to the activity. In some illustrative embodiments, power proxy units 228 and 238 track activity metrics on a per-chiplet basis, while in other illustrative embodiments, power proxy units 228 and 238 track the metrics on a per thread basis. Activity counters within each of power proxy units 228 and 238 track activities in cores 222 and 232, L2 cache 224 and 234, and L3 cache 226 and 236, respectively, and reset on activity read from the power proxy unit.

Each of power proxy units 228 and 238 count each of these activities in a counter. Power proxy units 228 and 238 multiply the individual counts by a weight factor specific to that particular activity to reach a value and store the value in an activity counter. A weight may be any value other than zero. In an illustrative embodiment, the weight factor comprises four bits. In other illustrative embodiments, the weight factor may be comprised of any number of bits.

Figure 3:
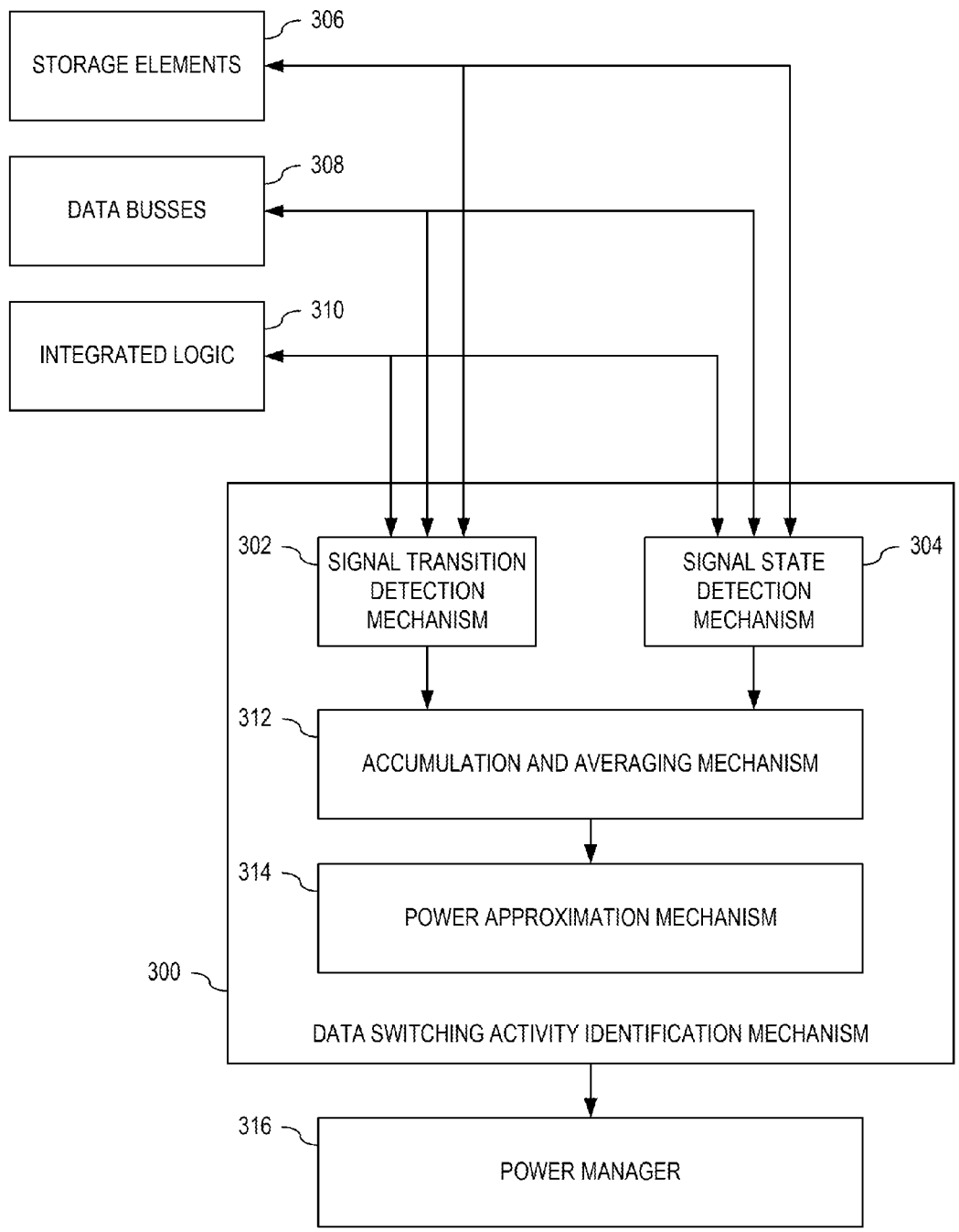
FIG. 3 depicts a block diagram of a data switching activity identification mechanism in accordance with an illustrative embodiment.

However, the activities tracked by power proxy units 228 and 238 fails to consider the power consumed by data switching activity that occurs in register files, caches, or the like in data processing system 200. FIG. 3 depicts a block diagram of a data switching activity identification mechanism in accordance with an illustrative embodiment. Data switching activity identification mechanism 300 comprises signal transition detection mechanism 302 and signal state detection mechanism 304. Signal transition detection mechanism 302 detects a transition of a signal associated with devices, such as register files, caches, or a device where data bits are stored, in storage elements 306, data busses 308, integrated logic 310, and/or other components within a data processing system that comprise microprocessors where data switching activity may be monitored. Likewise, signal state detection mechanism 304 detects a state of a signal associated with devices, such as register files, caches, or the like, in storage elements 306, data busses 308, integrated logic 310, and/or other components within a data processing system that comprise microprocessors where data switching activity may be monitored.

When data switching activity identification mechanism 300 is instantiated on a data processing system, signal transition detection mechanism 302 and signal state detection mechanism 304 detect the various signal transitions and signal states associated with all or portions of devices within storage elements 306, data busses 308, and/or integrated logic 310, such as register files, caches, or the like. A detailed description of various techniques used to detect the various signal transitions and signal states is detailed in FIGS. 4-7. As signal transition detection mechanism 302 detects a signal transition occurring or as signal state detection mechanism 304 detects a signal state within a device, signal transition detection mechanism 302 and/or signal state detection mechanism 304 sends the information to accumulation and averaging mechanism 312. Accumulation and averaging mechanism 312 accumulates the various signal transitions and signal states for the plurality of devices within the data processing system.

As an example of the operation performed by accumulation and averaging mechanism 312, the illustrative embodiments first consider a 64 bit word W stored in a register file, cache, or the like. Letting W' be the difference between the value of W at time t and time t+1, accumulation and averaging mechanism 312, measures either all of the ones in W' or an average number of ones in W', when accumulation and averaging mechanism 312 repeats the operation a large number of times T. Accumulation and averaging mechanism 312 may perform the operation for all bits in every register file, cache, or the like, in the data processing system, for a set of pre-identified bits from every register file, cache, or the like, in the data processing system, for a random sample of bits from every, register file, cache, or the like, in the data processing system, for a random sample of bits from randomly selected register files, caches, or the like in the data processing system, or the like.

As one example, the following is a determination of an accuracy of a power measurement for a number of ones (1s) in only one bit of W' associated with a 64 bit word, W. While this example is directed to a measurement of the number of ones in only one bit of W' associated with a 64 bit word W, one of ordinary skill in the art would recognize that the following example could be manipulated to measure the number of zeros (0s) in only one bit of W' associated with a 64 bit word W, without departing from the spirit and scope of the invention.

For a N bit binary string, which comprises a one (1) with probability, p, and a zero (0) with probability, 1−p. The ones (1s) may be distributed in any manner in the bit string. N is fairly large. Let n samples of one bit each be picked randomly from this bit string. In each trial, the probability of getting a one (1) is p and the probability of getting a zero (0) is (1−p). Since these are Bernoulli trials, where a Bernoulli trial is an experiment whose outcome is random and can be either of two possible outcomes, "success" and "failure", the sum of the sampled data would be: mean=n·p. Furthermore, the standard deviation under Bernoulli trials is given by: SDEV=SQRT(n·p·(1−p)). If n·P is large (for example, more than 10), then the binomial distribution may be approximated with a Gaussian distribution, which is a random distribution of events that is graphed as a "bell-shaped curve," and is used to represent a normal or statistically probable outcome and shows most samples falling closer to a mean value. In this example, n·p is in the range of 100s so an approximation of the distribution of sum may be made with a Gaussian distribution.

Now, from the Gaussian distribution, values of mean+ 3·SDEV occur with less than 1% probability. So, with 99 percent confidence, the number of ones (1s) in the sampled sum would be within the range mean+/−3·SDEV. Thus, accumulation and averaging mechanism 312 may calculate the maximum value of the sampled mean and use the maximum value to recompute the value of p, say p'=(mean+3·SDEV)/n. Thus, if accumulation and averaging mechanism 312 samples 10K times (n=10K, N=640K), then the accuracy of a power measurement may be off by at-most 1 to 2 percent, which may even be further reduced as the number of samples increases.

Returning to FIG. 3, as another example, the following is a determination of an average of 64 bits. A final sum of 64 bits is essentially a sum of 64 random variables, each with mean n·p and SDEV=n·p·(1−p). The sum of multiple Gaussian variables is also a Gaussian deviation with a MEAN equal to the sum of individual means and SDEV equal to SQRT (SDEV1$^2$+SDEV2$^2$+ . . . SDEV64$^2$). Thus, the effective SDEV relative to effective MEAN reduces by a factor of SQRT(64)=8. This indicates that the 99 percent confidence is for mean+/−(⅜) SDEV, which further indicates that the error bars have decreased by a factor of 8.

Returning to FIG. 3, at either predetermined time intervals, predetermined times, upon polling, or the like, accumulation and averaging mechanism 312 sends all the signal transition and signal state information or an average of the signal transition and signal state information to power approximation mechanism 314. Upon receiving the signal transition and signal state information, power approximation mechanism 314 may associate an estimate of energy consumed per signal transition and/or state change to provide a power approximation of the data switching activity in the data processing system. Power approximation mechanism 314 may repeat this operation at either predetermined time intervals, predetermined times, upon polling, or the like. Power approximation mechanism 314 may provide the power approximation to power manager 316, which may be the same power manager used by the power proxies, such as power manager 210 of FIG. 2. Power manager 316 may combine the power approximation due to data switching activity and the power usage estimate value from power proxy units 228 or 238 of FIG. 2 in order to compare the combined power estimate value to the received power proxy threshold value from a high-level power management controller for that component. Based on the comparison, power manager 316 may adjust operational parameters in order to achieve the power usage goals. Based on the combined power estimate value, if the power usage is not being exceeded, power manager 316 may send signals to increase the frequency, voltage, and/or pipeline instruction rate of the component. If the combined power estimate value exceeds the cap, then power manager 316 may send signals to decrease the frequency, voltage, and/or pipeline instruction rate of the component. Thus, power manager 316 is self-controlling based on combining the power approximation from power approximation mechanism 314 with the power proxy usage estimate values of the power proxy units and the power proxy threshold value for each component received from the high-level power management controller.

Figure 4:
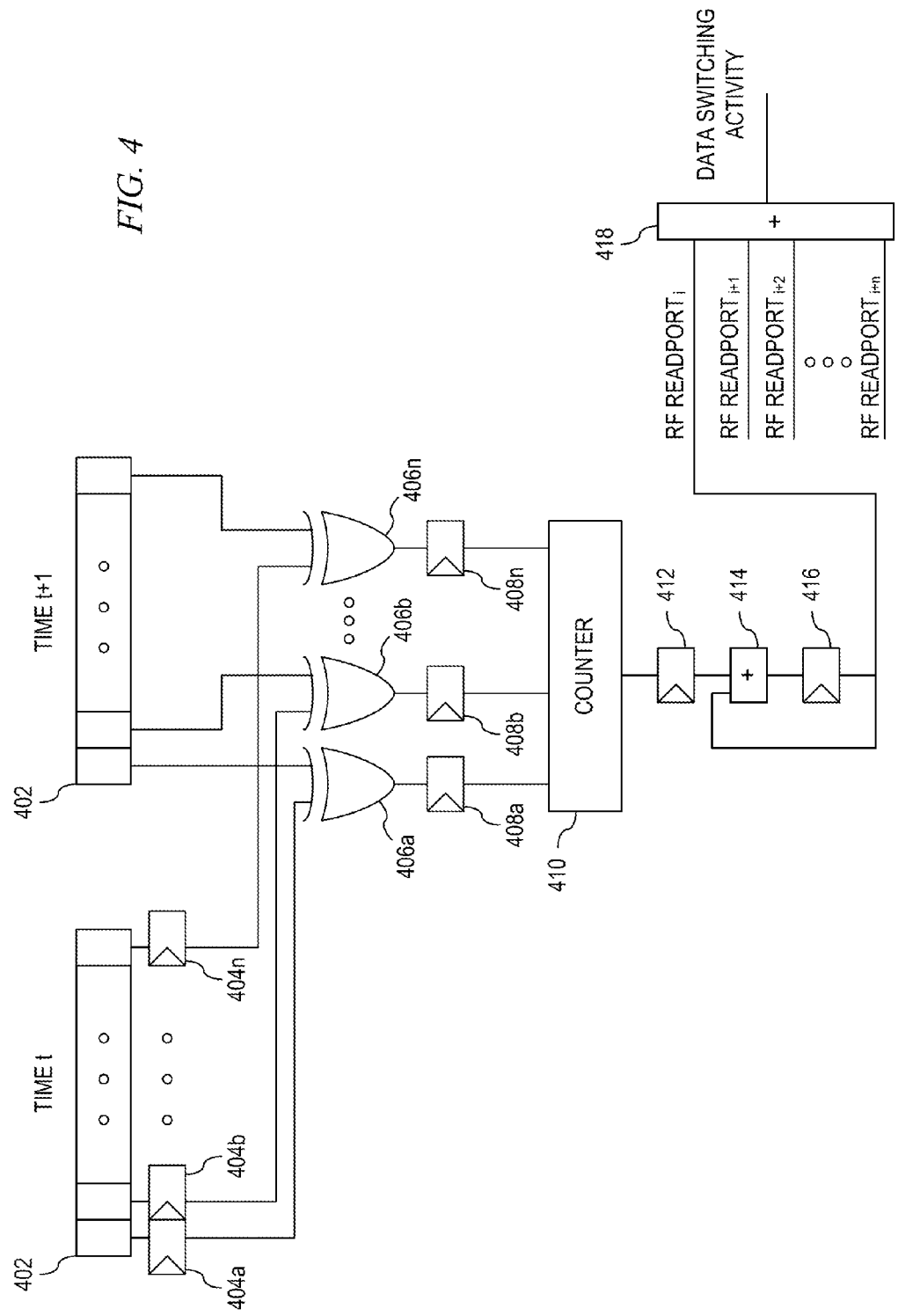
FIG. 4 depicts an example of detecting a signal change in every bit of an exemplary register file readport and summing the value along with other register file readport values in accordance with an illustrative embodiment.

FIG. 4 depicts an example of detecting a signal change in every bit of an exemplary register file readport and summing the value along with other register file readport values in accordance with an illustrative embodiment. While the example is for a register file readport, the process may be the same for any storage device in a data processing system where a transition from one state to another may be detected. In FIG. 4, register file read port output latch 402 that is storing word W is shown at time t and time t+1. Coupled to each bit of register file read port output latch 402 are latches 404a, 404b, . . . , 404n that capture the state of the bit at time t on each clock cycle. Latches 404a, 404b, . . . , 404n are then coupled to XOR gates 406a, 406b, . . . , 406n. In addition to being coupled to latches 404a, 404b, . . . , 404n, register file read port output latch 402 is also coupled directly to XOR gates 406a, 406b, . . . , 406n. At time t+1, latches 408a, 408b, . . . , 408n read the value being output by XOR gates 406a, 406b, . . . , 406n, which are comparing the value of their respective bit at time t+1 to the value stored in latches 404a, 404b, . . . , 404n at time t.

Counter 410 then counts how many of latches 408a, 408b, . . . , 408n have changed. That is, counter 410 counts how many of latches 408a, 408b, . . . , 408n are indicating a one (1) if ones are being counted or counts how many of latches 408a, 408b, . . . , 408n are indicating a zero (0) if zeros are being counted. Latch 412 then latches in the counted value from counter 410 and adder 414 adds this value to a value existing in latch 416. The exiting value in latch 416 may be zero at the initialization of the data processing system. Activity counter 418 may then add the value of latch 416 to values from similar latches associated with register file readports in the data processing system, which are calculated using the same method as described above. Activity counter 418 then sends the data switching activity value to an accumulation and averaging mechanism, such as accumulation and averaging mechanism 312 of FIG. 3.

Figure 5:
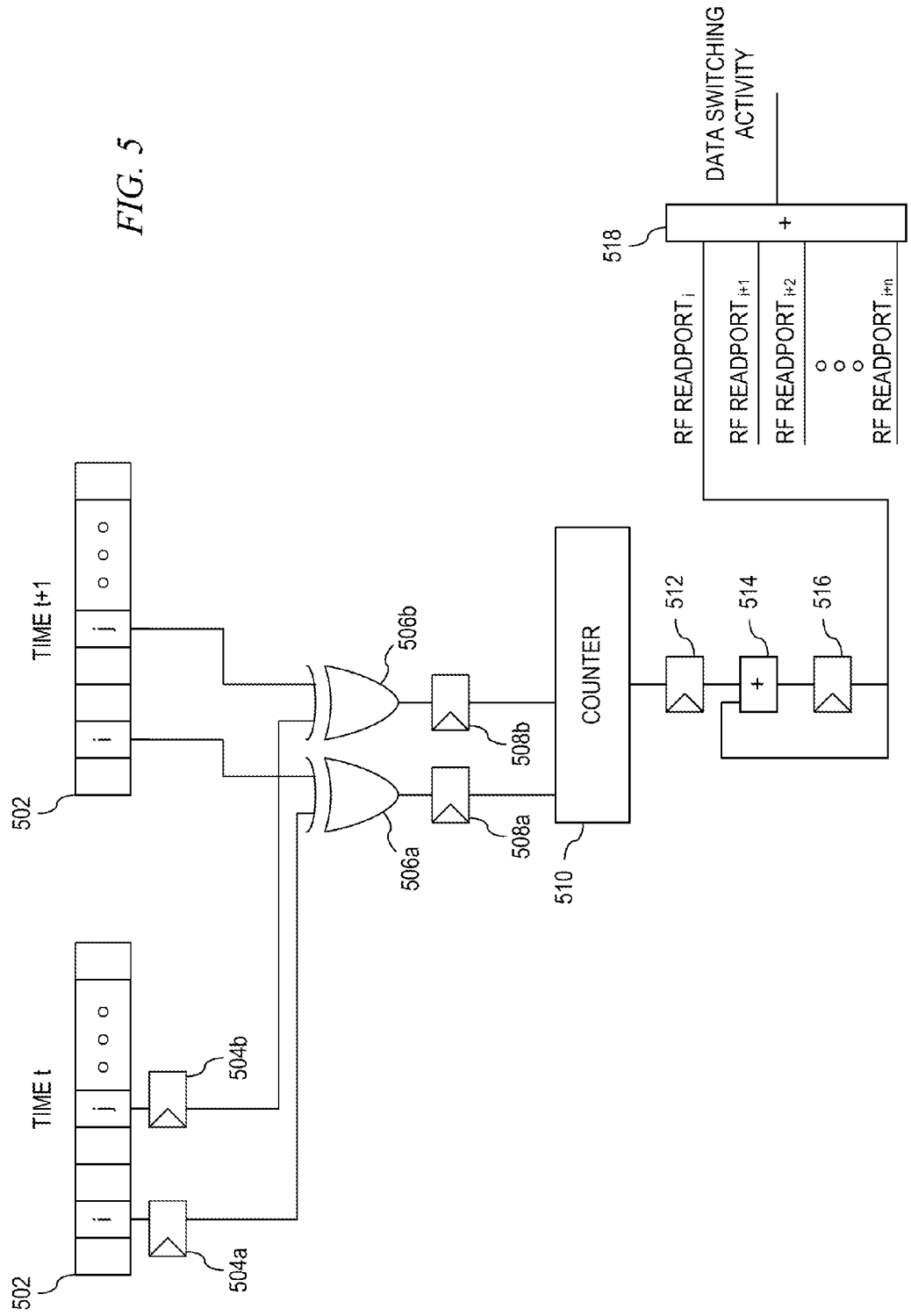
FIG. 5 depicts an example of detecting a signal change in randomly identified bits of an exemplary register file readport and summing the value along with other register file readport values in accordance with an illustrative embodiment.

FIG. 5 depicts an example of detecting a signal change in randomly identified bits of an exemplary register file readport and summing the value along with other register file readport values in accordance with an illustrative embodiment. While the example is for a register file readport, the process may be the same for any storage device in a data processing system where a transition from one state to another may be detected. In FIG. 5, register file read port output latch 502 that is storing word W is shown at time t and time t+1. In this example, bit i and j may be any randomly selected bits within register file read port output latch 502 as long as the same bits are sampled in consecutive cycles. Further, while this example shows two bits being sampled, any number of bits may be sampled such that the number of bits sampled is less than the entire number of bits in the stored word W and as long as the number of bits being sampled are greater than one. The randomly selected bits may be randomly selected through the use of a mechanism such as a random number generator. Coupled to each bit i and j of register file read port output latch 502 are latches 504a and 504b that capture the state of bit i and j at time t on each clock cycle. Latches 504a and 504b are then coupled to XOR gates 506a and 506b. In addition to being coupled to latches 504a and 504b, register file read port output latch 502 is also coupled directly to XOR gates 506a and 506b. At time t+1, latches 508a and 508b read the value being output by XOR gates 506a and 506b, which are comparing the value of their respective bit at time t+1 to the value stored in latches 504a and 504b at time t.

Counter 510 then counts whether latches 508a and 508b are indicating a one (1) if ones are being counted or counts whether latches 508a and 508b are indicating a zero (0) if zeros are being counted. Latch 512 then latches in the counted value from counter 510 and adder 514 adds this value to a value existing in latch 516. The exiting value in latch 516 may be zero at the initialization of the data processing system. Activity counter 518 may then add the value of latch 516 to values from similar latches associated with register file readports in the data processing system, which are calculated using the same method as described above. Activity counter 518 then sends the data switching activity value to an accumulation and averaging mechanism, such as accumulation and averaging mechanism 312 of FIG. 3.

Figure 6:
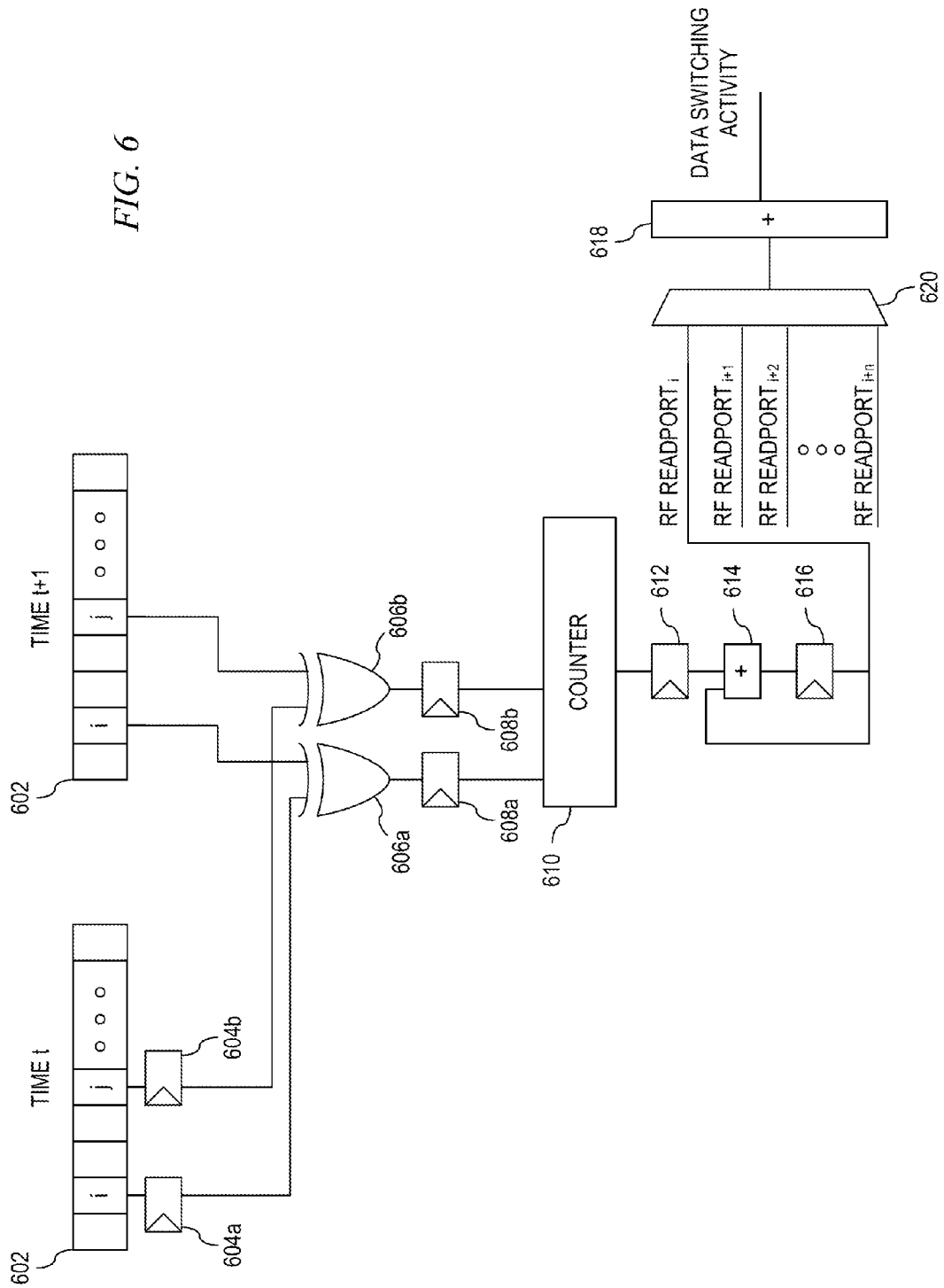
FIG. 6 depicts an example of detecting a signal change in randomly identified bits of an exemplary register file readport and summing the value along with randomly selected register file readport values in accordance with an illustrative embodiment.

FIG. 6 depicts an example of detecting a signal change in randomly identified bits of an exemplary register file readport and summing the value along with randomly selected register file readport values in accordance with an illustrative embodiment. While the example is for a register file readport, the process may be the same for any storage device in a data processing system where a transition from one state to another may be detected. In this example, bit i and j may be any randomly selected bits within register file read port output latch 602 as long as the same bits are sampled in consecutive cycles. The randomly selected bits may be randomly selected through the use of a mechanism such as a random number generator. Further, while this example shows two bits being sampled, any number of bits may be sampled such that the number of bits sampled is less than the entire number of bits in the stored word W and as long as the number of bits being sampled are greater than one. In FIG. 6, register file read port output latch 602 that is storing word W is shown at time t and time t+1. Coupled to each bit i and j of register file read port output latch 602 are latches 604a and 604b that capture the state of bit i and j at time t on each clock cycle. Latches 604a and 604b are then coupled to XOR gates 606a and 606b. In addition to being coupled to latches 604a and 604b, register file read port output latch 602 is also coupled directly to XOR gates 606a and 606b. At time t+1, latches 608a and 608b read the value being output by XOR gates 606a and 606b, which are comparing the value of their respective bit at time t+1 to the value stored in latches 604a and 604b at time t.

Counter 610 then counts whether latches 608a and 608b are indicating a one (1) if ones are being counted or counts whether latches 608a and 608b are indicating a zero (0) if zeros are being counted. Latch 612 then latches in the counted value from counter 610 and adder 614 adds this value to a value existing in latch 616. The exiting value in latch 616 may be zero at the initialization of the data processing system. Activity counter 618 may then add the value of randomly selected latches, such as latch 616 and similar latches associated with register file readports in the data processing system, and send the data switching activity value to an accumulation and averaging mechanism, such as accumulation and averaging mechanism 312 of FIG. 3. The specific latches may be randomly selected via a random number generator (not shown) that provides a input selection to multiplexer 620 of two or more randomly selected latches from the group of latches comprised by latch 616 and similar latches associated with register file readports in the data processing system. The randomly selected latches may be randomly selected through the use of a mechanism such as a random number generator.

Figure 7:
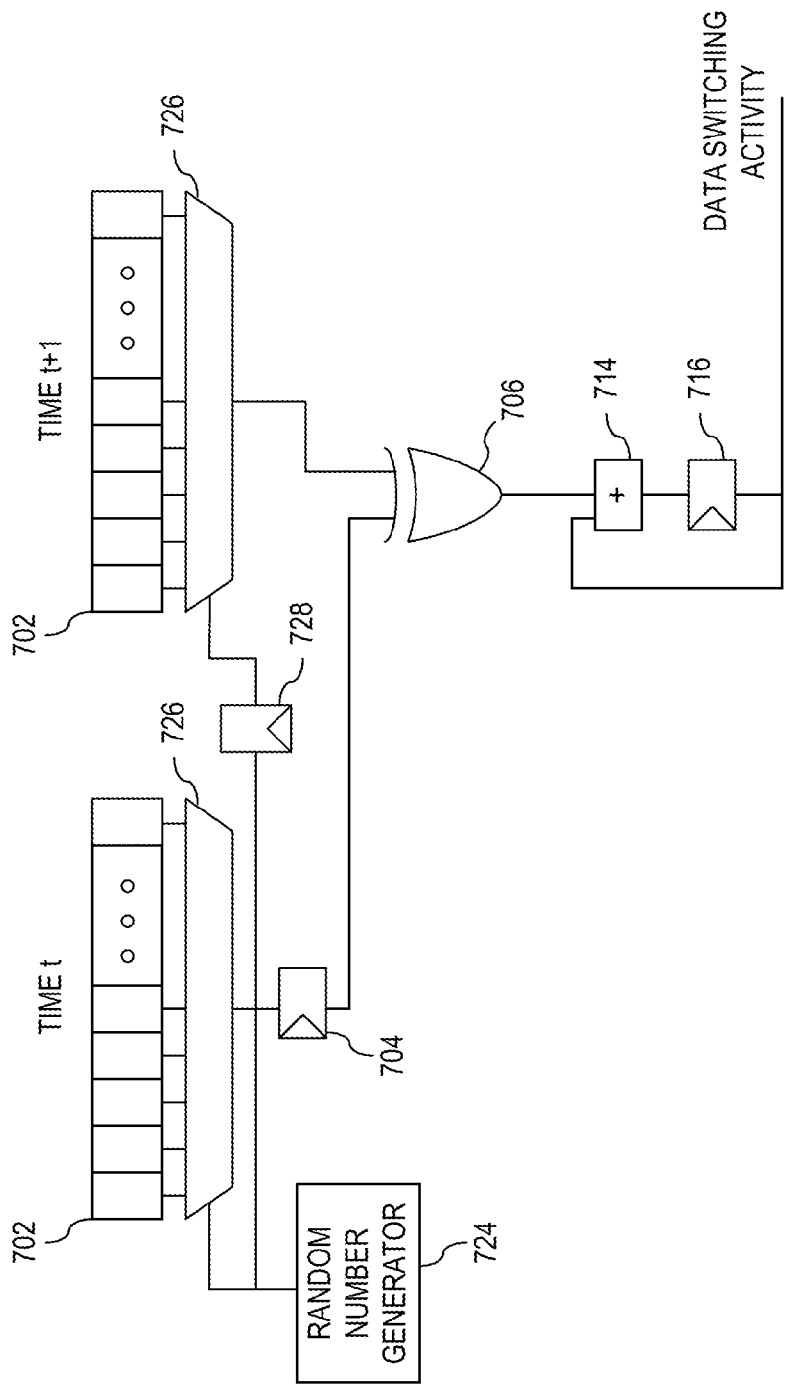
FIG. 7 depicts an example of detecting a signal change of a randomly selected bit of an exemplary randomly selected register file readport in accordance with an illustrative embodiment.

FIG. 7 depicts an example of detecting a signal change of a randomly selected bit of an exemplary randomly selected register file readport in accordance with an illustrative embodiment. While the example is for a register file readport, the process may be the same for any storage device in a data processing system where a transition from one state to another may be detected. In FIG. 7, randomly selected register file read port output latch 702 that is storing word W is shown at time t and time t+1. In this example, random number generator 724 may provide a selection of a single bit to multiplexer 726, which may be stored in latch 728 for use at time t+1. Coupled to multiplexer 726 is latch 704 that captures the state of the selected bit at time t on each clock cycle. Latch 704 is then coupled to XOR gate 706. In addition to being coupled to latch 704, randomly selected register file read port output latch 702 is also coupled directly to XOR gate 706 via multiplexer 726. At time t+1, adder 714 reads the value being output by XOR gate 706, which is comparing the value of the selected bit at time t+1 to the value stored in latch 704 at time t.

Adder 714 adds this value to a value existing in latch 716. The exiting value in latch 716 may be zero at the initialization of the data processing system. The value from latch 716 may then be added to values from similar latches associated with register file readports in the data processing system and send the data switching activity value to an accumulation and averaging mechanism, such as accumulation and averaging mechanism 312 of FIG. 3, or the value of latch 716 may then be added to the value of randomly selected latches, such as latch 716 and similar latches associated with register file readports in the data processing system, and send the data switching activity value to an accumulation and averaging mechanism, such as accumulation and averaging mechanism 312 of FIG. 3, or the data switching activity value of latch 716 may be directly sent to an accumulation and averaging mechanism, such as accumulation and averaging mechanism 312 of FIG. 3.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 8:
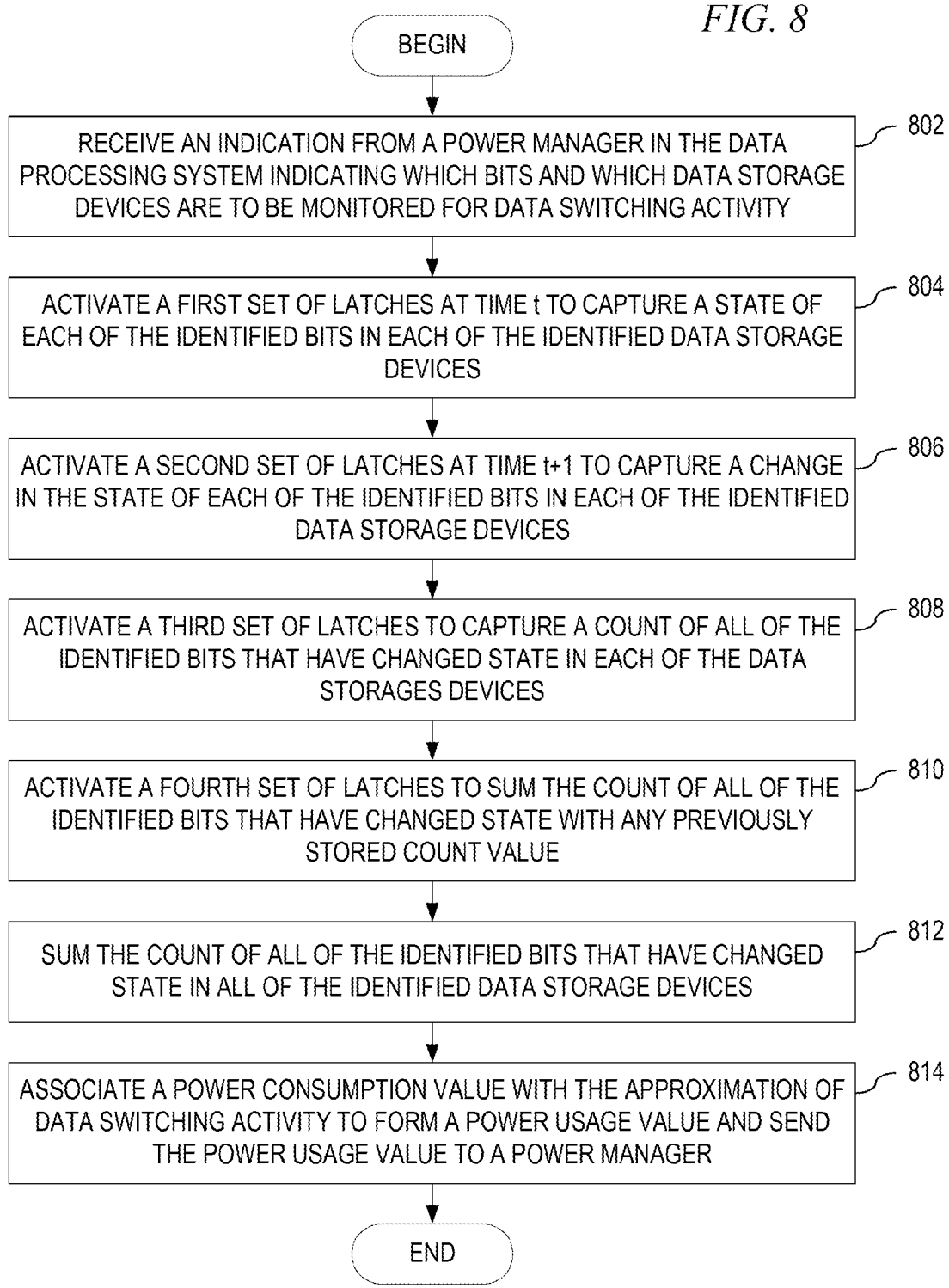
FIG. 8 is a flowchart illustrating the operation of approximating data switching activity in accordance with an illustrative embodiment.
Figure 9:
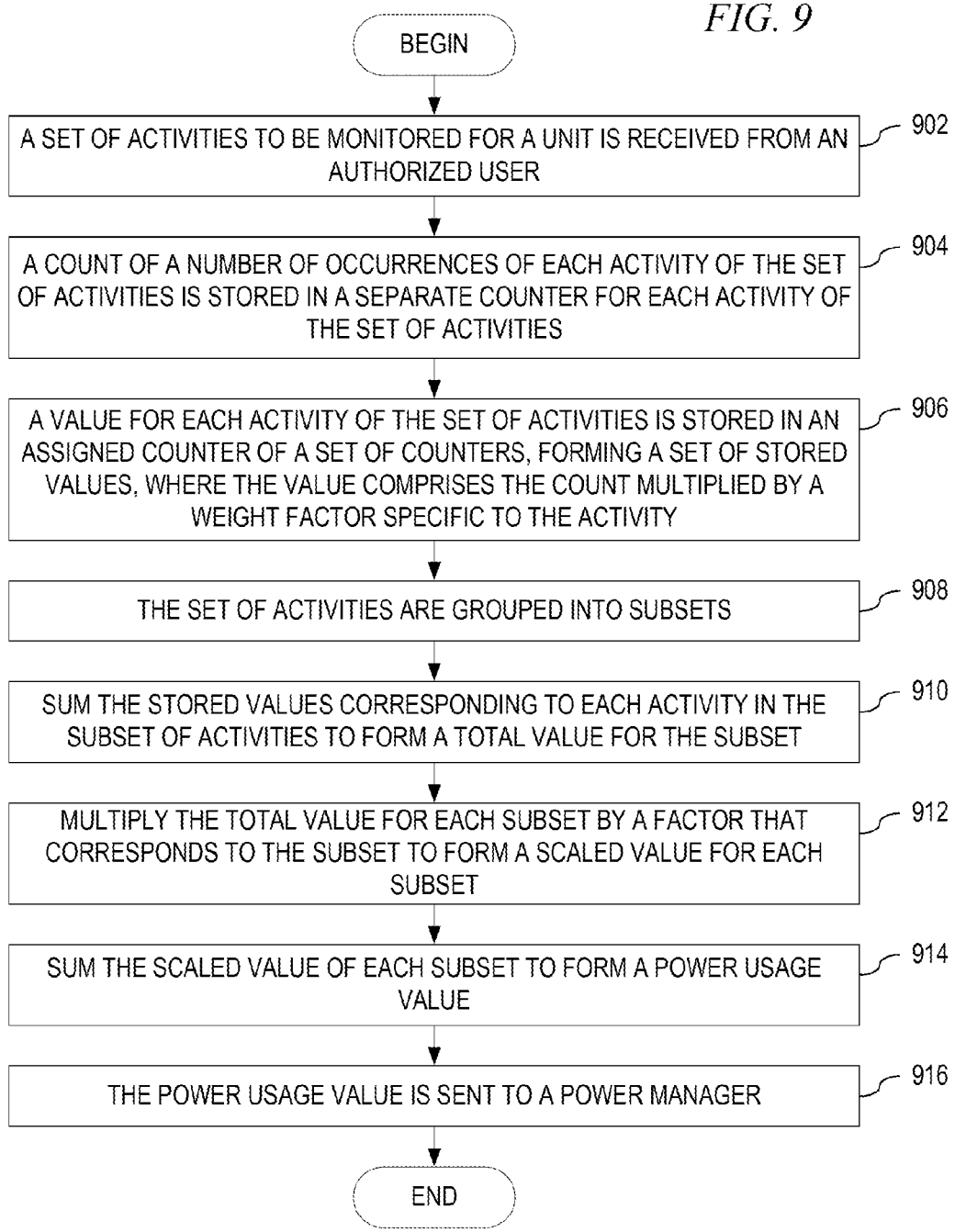
FIG. 9 is a flowchart illustrating the operation of estimating power consumption within a multi-core microprocessor chip for power proxies in accordance with an illustrative embodiment.
Figure 10:
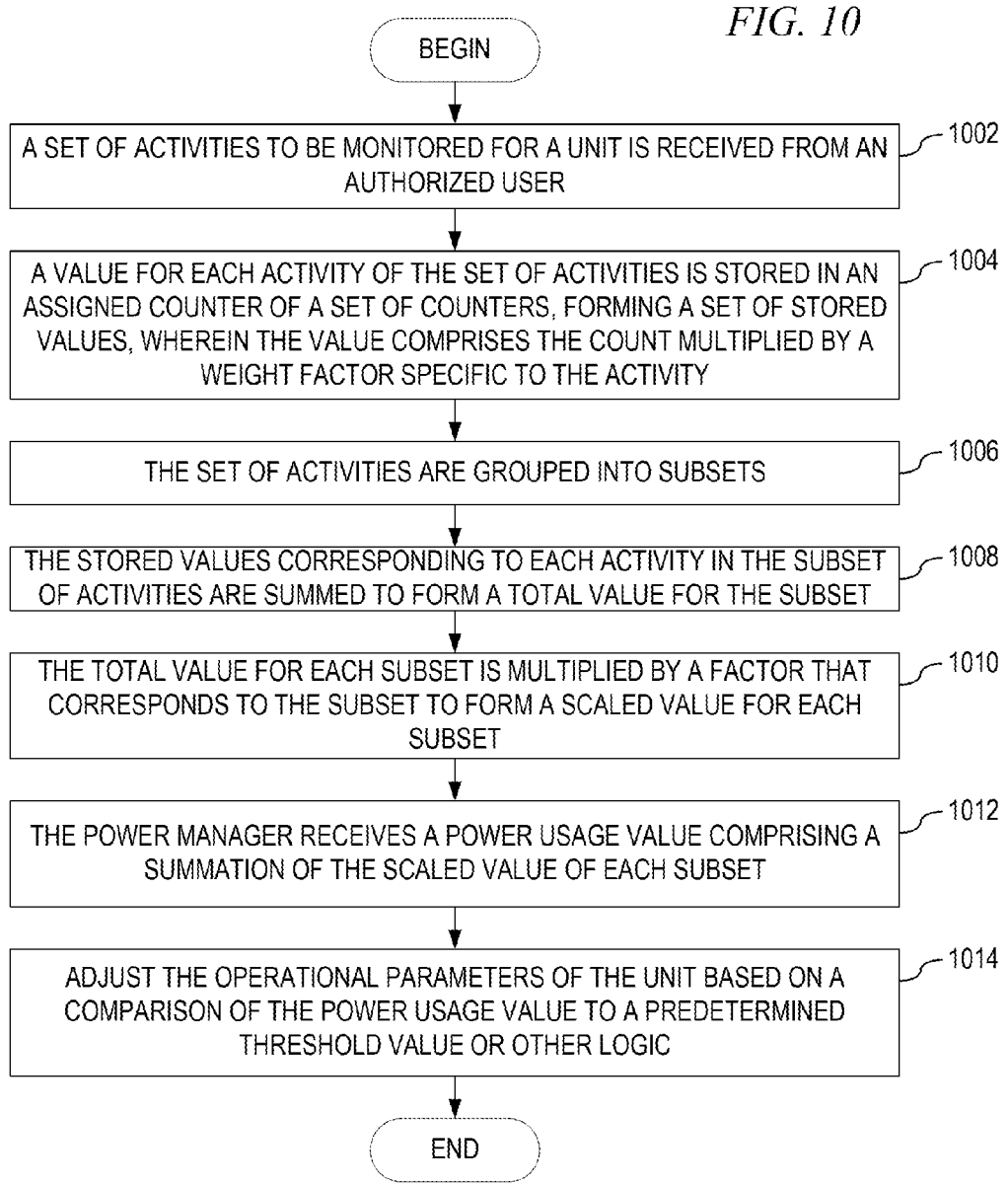
FIG. 10 is a flowchart illustrating the operation of estimating power consumption within a multi-core microprocessor chip using both a power usage value estimated by power proxies and power usage value estimated by a data switching activity identification mechanism in accordance with an illustrative embodiment.

Referring now to FIGS. 8-10, these figures provide flowcharts outlining example operations of approximating data switching activity and improving the accuracy of a power proxy architecture in accordance with an illustrative embodiment. FIG. 8 is a flowchart illustrating the operation of approximating data switching activity in accordance with an illustrative embodiment. As the operation begins, a data switching activity identification mechanism receives an indication from a power manager in the data processing system indicating which bits and which data storage devices are to be monitored for data switching activity (step 802). As is illustrated in FIG. 4-7, all bits in a data storage device may be monitored, only a portion of the bits in a data storage device may be monitored, or random bits in the data storage device may be monitored. Likewise, all data storage devices may be monitored, only a portion of the data storage devices may be monitored, or random data storage devices may be monitored.

After identifying which bits and which data storage devices are to be monitored for data switching activity, data switching activity identification mechanism activates a first set of latches at time t to capture a state of each of the identified bits in each of the identified data storage devices (step 804). At time t+1, data switching activity identification mechanism activates a second set of latches to capture a change in the state of each of the identified bits in each of the identified data storage devices (step 806). The data switching activity identification mechanism then activates a third set of latches to capture a count of all of the identified bits that have changed state in each of the data storages devices (step 808). The data switching activity identification mechanism then activates a fourth set of latches to sum the count of all of the identified bits that have changed state with any previously stored count value (step 810). The data switching activity identification mechanism then sums the count of all of the identified bits that have changed state in all of the identified data storage devices to obtain an approximation of data switching activity for all of the identified data storage devices (step 812). The data switching activity identification mechanism may then associate a power consumption value with the approximation of data switching activity to form a power usage value and send the power usage value to a power manager (step 814), with the operation ending thereafter.

FIG. 9 is a flowchart illustrating the operation of estimating power consumption within a multi-core microprocessor chip for power proxies in accordance with an illustrative embodiment. The operation begins when a set of activities to be monitored for a unit is received from an authorized user (step 902). The unit can be a chip or a thread or a processing unit such as a crypto or decompression assist unit. Some examples of activity are execution regfile access, instructions dispatched, instructions completed, execution pipe issue types, L2 cache reads and writes, and L3 cache reads and writes. Additionally, an authorized user can also assign what counters are to be used to monitor the selected activities. The authorized user makes these selections through the use of a programmable interface. The authorized user can also assign the weight factors to the activities through the use of this interface.

A count of a number of occurrences of each activity of the set of activities is stored in a separate counter for each activity of the set of activities (step 904). A value for each activity of the set of activities is stored in an assigned counter of a set of counters, forming a set of stored values, wherein the value comprises the count multiplied by a weight factor specific to the activity (step 906). The weight factor is determined based on pre-silicon and post-silicon tuning. Each power proxy unit manages a set of counters. The power proxy unit collects the stored values for the set of counters the power proxy units manages in parallel. Further, a single power manager manages a number of power proxy units. Each power proxy has one or more units assigned that the power proxy unit monitors. The power proxy units may then collect values in parallel or independently of each other. Further the collection period is configurable for each power proxy unit and each power proxy unit may collect the stored values for different periods than every other power proxy managed by a power manager.

The set of activities are grouped into subsets (step 908). The power proxy unit sums the stored values corresponding to each activity in the subset of activities to form a total value for the subset (step 910). The power proxy unit multiplies the total value for each subset by a factor that corresponds to the subset to form a scaled value for each subset (step 912). The power proxy unit sums the scaled value of each subset to form a power usage value (step 914). A constant value may be added to the summation to account for leakage power or baseline power. In other illustrative embodiments, other factors may be used to determine a constant value. Any arithmetic or logic may be used when adding the constant. In other illustrative embodiments, a 32 or 64 bits floating point number for each activity may be used and the subsets may be skipped. The power usage value is sent to a power manager (step 916), with the operation ending thereafter.

FIG. 10 is a flowchart illustrating the operation of estimating power consumption within a multi-core microprocessor chip using both a power usage value estimated by power proxies and power usage value estimated by a data switching activity identification mechanism in accordance with an illustrative embodiment. The operation of FIG. 10 may be implemented in a microprocessor. The operation begins when a set of activities to be monitored for a unit is received from an authorized user (step 1002). The set of activities may include activities for the power proxy units as well as an identification of which bits in which data storage devices are to be monitored. A value for each activity of the set of activities is stored in an assigned counter of a set of counters, forming a set of stored values, wherein the value comprises the count multiplied by a weight factor specific to the activity (step 1004). The set of activities are grouped into subsets (step 1006). In one or more illustrative embodiments, subsets may correspond to frequency of occurrence of activity. In different illustrative embodiments, a weighted average of the occurrence of the activity may be used. In other illustrative embodiments, subsets may correspond to power consumption. Subsets may also correspond to where the activity occurs, such as L2 cache activity subset, core activity subset, L3 cache activity subset, data switching activity, or the like. Also, subsets may be skipped altogether. For example, subsets may be skipped when there are no physical space limitations, such as in a software embodiment.

In one or more illustrative embodiments, subsets are grouped by a combination of frequency of occurrence, power consumption, and location of where the activity occurs. For example, subsets may be grouped with first the frequency of occurrence, then further grouped by location. In another example, subsets may be grouped by frequency of occurrence and power consumption combined into the same subset, then further grouped by location. In yet another example, subsets may be grouped by location, then by power consumption.

The stored values corresponding to each activity in the subset of activities are summed to form a total value for the subset (step 1008). The total value for each subset is multiplied by a factor that corresponds to the subset to form a scaled value for each subset (step 1010). A constant value may be added to the summation to account for leakage power or baseline power. In other illustrative embodiments, other factors may be used to determine a constant value. The power manager receives a power usage value comprising a summation of the scaled value of each subset (step 1012) along with any constant, if used. The power manager adjusts the operational parameters of the unit based on a comparison of the power usage value to a predetermined threshold value or other logic (step 1014), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the high-level power management controller monitors temperature, voltage leakage, voltage consumption, and/or the like, for each of a set of components in the data processing system. Based on an overall predetermined power scheme for the data processing system, the high-level power management controller automatically set or adjusts a power proxy threshold value for each component in the set of components. Component hardware compares an obtained power proxy usage estimate of the component along with the approximation of data switching activity to the power proxy threshold value identified by the high-level power management controller. In response to the obtained power proxy usage estimate and the approximation of data switching activity exceeding the set power proxy usage estimate, the component hardware adjusts the operational parameters of the unit based on a comparison of the power usage value to a predetermined threshold value or other logic.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for approximating data switching activity, the method comprising:
   identifying, by a data switching activity identification mechanism in the data processing system, a set of data storage devices and a set of bits in the set of data storage devices in the data processing system to be monitored for the data switching activity; and
   during execution of software on the data processing system:
      for each data storage device in the set of data storage devices:
         capturing, by the data switching activity identification mechanism, a state of each bit in the set of bits at time t, wherein the state of each bit in the set of bits at time t is captured via a latch coupled to a device storing the bit;
         capturing, by the data switching activity identification mechanism, a state of each bit in the set of bits at time t+1, wherein the state of each bit in the set of bits at time t+1 is captured by an XOR gate via a direct couple from the device storing the bit to an input of the XOR gate;
         capturing, by the data switching activity identification mechanism, a count of all of the bits in the set of bits that have changed state from time t to time t+1, wherein the state for each bit that has changed from time t to time t+1 is captured via the XOR gate comparing the state of the bit at time t+1, via the direct couple from the device storing the bit to the input of the XOR gate, to the state of the bit at time t, via the latch that is coupled to the input of the XOR gate, wherein the state for each bit that has changed from time t to time t+1 is counted via a counter that is coupled to all of the outputs of the XOR gates for all of the bits in the set of bits, and wherein the count of all of the bits in the set of bits that have changed state from time t to time t+1 is captured by a count latch coupled to the counter; and
         summing, by the data switching activity identification mechanism, the count of all of the bits in the set of bits that have changed state with any previously stored count of bits that have changed state for the data storage device to form a count of identified bits that have changed state, wherein the previously stored count of bits that have changed state is stored in an output latch and wherein the output latch is updated with count of identified bits that have changed state by an adder that sums the count of all the bits that have changed states with the previously stored count of bits that have changed state for the data storage device prior to updating the output latch;
      summing, by the data switching activity identification mechanism, the count of the identified bits that have changed state for the data storage device along with other counts of the identified bits that have changed state for other data storage devices in the set of data storage devices to form an approximation of data switching activity; and
      adjusting, by a power manager, a set of operational parameters associated with the data processing system using the approximation of data switching activity.

2. The method of claim 1, wherein the set of operational parameters associated with the data processing system are adjusted based on a power consumption value that is associated with the approximation of data switching activity thereby forming a power usage value.

3. The method of claim 1, wherein the identification of the set of data storage devices and the set of bits in the set of data storage devices to be monitored for the data switching activity is all bits in the set of bits and all data storage devices in the set of data storage devices in the data processing system.

4. The method of claim 1, wherein the identification of the set of data storage devices and the set of bits in the set of data storage devices to be monitored for the data switching activity is randomly selected bits in the set of bits and all data storage devices in the set of data storage devices in the data processing system.

5. The method of claim 1, wherein the identification of the set of data storage devices and the set of bits in the set of data storage devices to be monitored for the data switching activity is randomly selected bits in the set of bits and randomly selected data storage devices in the set of data storage devices in the data processing system.

6. The method of claim 1, wherein the identification of the set of data storage devices and the set of bits in the set of data storage devices to be monitored for the data switching activity is a single bit in the set of bits and a single data storage device in the set of data storage devices in the data processing system.

7. The method of claim 1, further comprising:
obtaining, by the power manager, a power usage estimate value identifying a current power usage estimate for a set of components in the data processing system;
summing, by the power manager, the power usage estimate value with a power consumption value that is associated with the approximation of data switching activity thereby forming a power usage value;
identifying, by the power manager, a proxy power threshold value, for a defined power target value;
determining, by the power manager, if the power usage value is greater than the power proxy threshold value;
responsive to the power usage value being greater than the power proxy threshold value, adjusting, by the power manager, a set of operational parameters associated with the data processing system in order to meet the defined power target value.

8. The method of claim 1, wherein the set of operational parameters is at least one of frequency, voltage, or pipeline instruction rate.

9. A computer program product comprising a computer readable storage medium having a computer readable program stored therein, wherein the computer readable program, when executed on a computing device, causes the computing device to:
identify a set of data storage devices and a set of bits in the set of data storage devices in the data processing system to be monitored for the data switching activity; and
during execution of software on the data processing system:
for each data storage device in the set of data storage devices:
capture a state of each bit in the set of bits at time t, wherein the state of each bit in the set of bits at time t is captured via a latch coupled to a device storing the bit;
capture a state of each bit in the set of bits at time t+1, wherein the state of each bit in the set of bits at time t+1 is captured by an XOR gate via a direct couple from the device storing the bit to an input of the XOR gate;
capture a count of all of the bits in the set of bits that have changed state from time t to time t+1, wherein the state for each bit that has changed from time t to time t+1 is captured via the XOR gate comparing the state of the bit at time t+1, via the direct couple from the device storing the bit to the input of the XOR gate, to the state of the bit at time t, via the latch that is coupled to the input of the XOR gate, wherein the state for each bit that has changed from time t to time t+1 is counted via a counter that is coupled to all of the outputs of the XOR gates for all of the bits in the set of bits, and wherein the count of all of the bits in the set of bits that have changed state from time t to time t+1 is captured by a count latch coupled to the counter; and
sum the count of all of the bits in the set of bits that have changed state with any previously stored count of bits that have changed state for the data storage device to form a count of identified bits that have changed state, wherein the previously stored count of bits that have changed state is stored in an output latch and wherein the output latch is updated with count of identified bits that have changed state by an adder that sums the count of all the bits that have changed states with the previously stored count of bits that have changed state for the data storage device prior to updating the output latch;
sum the count of the identified bits that have changed state for the data storage device along with other counts of the identified bits that have changed state for other data storage devices in the set of data storage devices to form an approximation of data switching activity; and
adjust a set of operational parameters associated with the data processing system using the approximation of data switching activity.

10. The computer program product of claim 9, wherein the set of operational parameters associated with the data processing system are adjusted based on a power consumption value that is associated with the approximation of data switching activity thereby forming a power usage value.

11. The computer program product of claim 9, wherein the identification of the set of data storage devices and the set of bits in the set of data storage devices to be monitored for the data switching activity is all bits in the set of bits and all data storage devices in the set of data storage devices in the data processing system.

12. The computer program product of claim 9, wherein the identification of the set of data storage devices and the set of bits in the set of data storage devices to be monitored for the data switching activity is randomly selected bits in the set of bits and all data storage devices in the set of data storage devices in the data processing system.

13. The computer program product of claim 9, wherein the identification of the set of data storage devices and the set of bits in the set of data storage devices to be monitored for the data switching activity is randomly selected bits in the set of bits and randomly selected data storage devices in the set of data storage devices in the data processing system.

14. The computer program product of claim 9, wherein the identification of the set of data storage devices and the set of bits in the set of data storage devices to be monitored for the data switching activity is a single bit in the set of bits and a single data storage device in the set of data storage devices in the data processing system.

15. An apparatus, comprising:
a processor; and
a memory coupled to the processor, wherein the memory comprises instructions which, when executed by the processor, cause the processor to:

identify a set of data storage devices and a set of bits in the set of data storage devices in the data processing system to be monitored for the data switching activity; and during execution of software on the data processing system;

for each data storage device in the set of data storage devices:

capture a state of each bit in the set of bits at time t, wherein the state of each bit in the set of bits at time t is captured via a latch coupled to a device storing the bit; and capture a state of each bit in the set of bits at time t+1, wherein the state of each bit in the set of bits at time t+1 is captured by an XOR gate via a direct couple from the device storing the bit to an input of the XOR gate;

capture a count of all of the bits in the set of bits that have changed state from time t to time t+1, wherein the state for each bit that has changed from time t to time t+1 is captured via the XOR gate comparing the state of the bit at time t+1, via the direct couple from the device storing the bit to the input of the XOR gate, to the state of the bit at time t, via the latch that is coupled to the input of the XOR gate, wherein the state for each bit that has changed from time t to time t+1 is counted via a counter that is coupled to all of the outputs of the XOR gates for all of the bits in the set of bits, and wherein the count of all of the bits in the set of bits that have changed state from time t to time t+1 is captured by a count latch coupled to the counter; and sum the count of all of the bits in the set of bits that have changed state with any previously stored count of bits that have changed state for the data storage device to form a count of identified bits that have changed state, wherein the previously stored count of bits that have changed state is stored in an output latch and wherein the output latch is updated with count of identified bits that have changed state by an adder that sums the count of all the bits that have changed states with the previously stored count of bits that have changed state for the data storage device prior to updating the output latch;

sum the count of the identified bits that have changed state for the data storage device along with other counts of the identified bits that have changed state for other data storage devices in the set of data storage devices to form an approximation of data switching activity; and adjust a set of operational parameters associated with the data processing system using the approximation of data switching activity.

16. The apparatus of claim 15, wherein the set of operational parameters associated with the data processing system are adjusted based on a power consumption value that is associated with the approximation of data switching activity thereby forming a power usage value.

17. The apparatus of claim 15, wherein the identification of the set of data storage devices and the set of bits in the set of data storage devices to be monitored for the data switching activity is all bits in the set of bits and all data storage devices in the set of data storage devices in the data processing system.

18. The apparatus of claim 15, wherein the identification of the set of data storage devices and the set of bits in the set of data storage devices to be monitored for the data switching activity is randomly selected bits in the set of bits and all data storage devices in the set of data storage devices in the data processing system.

19. The apparatus of claim 15, wherein the identification of the set of data storage devices and the set of bits in the set of data storage devices to be monitored for the data switching activity is randomly selected bits in the set of bits and randomly selected data storage devices in the set of data storage devices in the data processing system.

20. The apparatus of claim 15, wherein the identification of the set of data storage devices and the set of bits in the set of data storage devices to be monitored for the data switching activity is a single bit in the set of bits and a single data storage device in the set of data storage devices in the data processing system.

* * * * *